US009639654B2

(12) United States Patent
Chen et al.

(10) Patent No.: US 9,639,654 B2
(45) Date of Patent: May 2, 2017

(54) MANAGING VIRTUAL BOUNDARIES TO ENABLE LOCK-FREE CONCURRENT REGION OPTIMIZATION OF AN INTEGRATED CIRCUIT

(71) Applicant: International Business Machines Corporation, Armonk, NY (US)

(72) Inventors: Bijian Chen, Austin, TX (US); David J. Hathaway, Underhill, VT (US); Nathaniel D. Hieter, Clinton Corners, NY (US); Kerim Kalafala, Rhinebeck, NY (US); Jeffrey S. Piaget, Red Hook, NY (US); Alexander J. Suess, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/567,569

(22) Filed: Dec. 11, 2014

(65) Prior Publication Data
US 2016/0171147 A1 Jun. 16, 2016

(51) Int. Cl.
*G06F 17/50* (2006.01)

(52) U.S. Cl.
CPC ........ *G06F 17/5081* (2013.01); *G06F 17/505* (2013.01)

(58) Field of Classification Search
CPC . G06F 17/5022; G06F 17/5031; G06F 17/505
See application file for complete search history.

(56) References Cited

U.S. PATENT DOCUMENTS

| | | | |
|---|---|---|---|
| 5,495,419 A | 2/1996 | Rostoker et al. | |
| 5,859,782 A | 1/1999 | Scepanovic et al. | |
| 5,877,965 A | 3/1999 | Hieter et al. | |
| 6,080,204 A * | 6/2000 | Mendel | G06F 17/5054 716/103 |
| 6,449,756 B1 | 9/2002 | Malik et al. | |
| 6,557,145 B2 | 4/2003 | Boyle et al. | |
| 6,823,294 B1 * | 11/2004 | Guthrie | G06F 17/50 700/182 |
| 7,178,120 B2 | 2/2007 | Hieter et al. | |
| 7,322,018 B2 | 1/2008 | Rast et al. | |
| 2001/0010090 A1 * | 7/2001 | Boyle | G06F 17/505 716/105 |

(Continued)

OTHER PUBLICATIONS

Alpert et al., "Recent Directions in Netlist Partitioning: A Survey", Integration, the VLSI Journal, vol. 19, Issue 1-2, Aug. 1995, pp. 1-81, Elsevier Science Publishers B. V. Amsterdam, The Netherlands, The Netherlands.

*Primary Examiner* — Eric Lee
*Assistant Examiner* — Aric Lin
(74) *Attorney, Agent, or Firm* — Brandon C. Kennedy; Steven Meyers; Kennedy Lenart Spraggins LLP

(57) ABSTRACT

Managing virtual boundaries to enable lock-free concurrent region optimization, including: receiving a model of an integrated circuit ('IC'); dividing the model into a plurality of regions, wherein none of the plurality of regions overlap with another region; assigning each of the plurality of regions to a thread of execution, wherein each thread of execution utilizes a shared memory space; and optimizing, by each thread in parallel, the assigned region.

15 Claims, 7 Drawing Sheets

(56) References Cited

U.S. PATENT DOCUMENTS

| | | | |
|---|---|---|---|
| 2002/0073257 A1* | 6/2002 | Beukema | H04L 12/4633 710/105 |
| 2005/0108665 A1* | 5/2005 | Neves | G06F 17/505 716/113 |
| 2006/0136855 A1* | 6/2006 | Hoff | G06F 17/5045 716/112 |
| 2006/0184350 A1* | 8/2006 | Huang | G06F 17/5027 703/26 |
| 2009/0119630 A1* | 5/2009 | Binder | G06F 17/5031 716/113 |
| 2014/0282300 A1* | 9/2014 | Katakamsetty | G06F 17/5081 716/53 |
| 2015/0033197 A1* | 1/2015 | Borah | G06F 17/5072 716/113 |

* cited by examiner

MANAGING VIRTUAL BOUNDARIES TO ENABLE LOCK-FREE CONCURRENT REGION OPTIMIZATION OF AN INTEGRATED CIRCUIT

BACKGROUND

The present disclosure is generally related to data processing, or, more specifically, methods, apparatuses, and products for managing virtual boundaries to enable lock-free concurrent region optimization of an integrated circuit.

DESCRIPTION OF RELATED ART

The problem of design closure of Very Large Scale Integrated ('VLSI') chips or integrated circuits involves the combination of logic synthesis algorithms with placement and routing algorithms in order to meet timing, area and other design objectives for the chip. Logic synthesis algorithms change the type and connectivity of circuits used to implement the functionality of the chip. Placement algorithms alter the physical locations of the circuits on the chip. Routing algorithms modify the wire type and path of the connections between the circuits. As the size of the VLSI chips grows, the problem of design closure increases correspondingly at a geometric rate. Enabling parallel optimization in this environment is thus, highly desirable.

The frequency of a chip is limited by the transmission delay through the longest path of circuits on the chip. The act of timing closure is the manipulation of logical, placement, and routing attributes to achieve the desired chip frequency. This optimization of the timing model is a global problem, as is the use of the placement and routing resources. The global nature of chip design closure presents unique challenges to the use of parallelism in the optimization environment.

SUMMARY

Methods, apparatuses, and products for managing virtual boundaries to enable lock-free concurrent region optimization, including: receiving a model of an integrated circuit ('IC'); dividing the model into a plurality of regions, wherein none of the regions overlap with another region; assigning each of the plurality of regions to a thread of execution, wherein each thread of execution utilizes a shared memory space; and optimizing, by each thread in parallel, the assigned region.

The foregoing and other objects, features and advantages described herein will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

Figure 1:
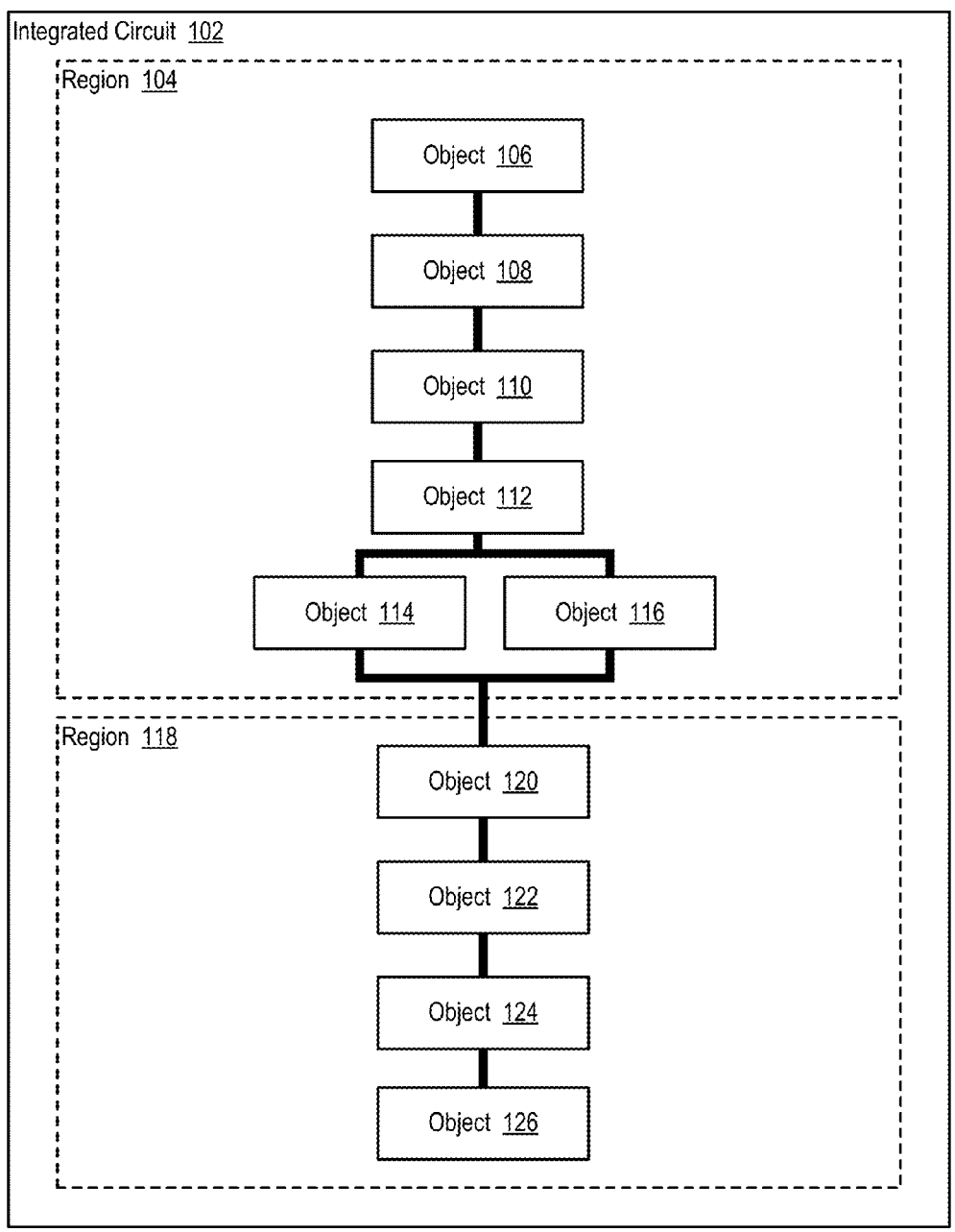
FIG. 1 sets forth a block diagram of an integrated circuit that may be broken up into a plurality of regions according to embodiments described herein.

Example methods, apparatuses, and products for managing virtual boundaries to enable lock-free concurrent region optimization of an integrated circuit in accordance with embodiments described herein are described with reference to the accompanying drawings, beginning with FIG. 1. FIG. 1 sets forth a block diagram of an integrated circuit (102) that may be broken up into a plurality of regions (104, 118).

The integrated circuit (102) of FIG. 1 may be embodied as is a set of electronic circuits on a small plate or chip of semiconductor material such as silicon. The integrated circuit (102) depicted in FIG. 1 includes a plurality of objects (106, 108, 110, 112, 114, 116, 120, 122, 124, 126). Each object (106, 108, 110, 112, 114, 116, 120, 122, 124, 126) may be embodied, for example, as an electric circuit configured to carry out a logic function, as a cell from a cell library, as a grouping of electrical components such as transistors, and so on. Each object (106, 108, 110, 112, 114, 116, 120, 122, 124, 126) in FIG. 1 may be coupled by one or more interconnect structures such that each object (106, 108, 110, 112, 114, 116, 120, 122, 124, 126) can receive a signal over an input pin, each object (106, 108, 110, 112, 114, 116, 120, 122, 124, 126) can output a signal via an output pin, and so on.

The integrated circuit (102) of FIG. 1 is broken up into a plurality of regions (104, 118). Each region (104, 118) represents a subset of the entire integrated circuit (102) and can include one or more objects (106, 108, 110, 112, 114, 116, 120, 122, 124, 126). By breaking the integrated circuit (102) into a plurality of regions (104, 118), optimizing the physical layout of an entire integrated circuit (102) can effectively be broken down into smaller tasks of optimizing the physical layout of a particular region (104, 118), where each region (104, 118) may be optimized concurrently. In such an example, each region (104, 118) is defined by a set of virtual boundaries that designate where one region (104, 118) ends and another begins.

Managing virtual boundaries to enable lock-free concurrent region optimization of an integrated circuit according to embodiments described herein is generally implemented with computers, that is, with automated computing machinery. For further explanation, therefore, FIG. 2 sets forth a block diagram of automated computing machinery comprising an example computer (152) useful in managing virtual boundaries to enable lock-free concurrent region optimization of an integrated circuit according to embodiments described herein. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152). Readers will appreciate that although not illustrated in FIG. 2, computers useful in managing virtual boundaries to enable lock-free concurrent region optimization of an integrated circuit according to embodiments described herein my include multiple processors, each of which may be concurrently executing different threads of execution.

Stored in RAM (168) is a region optimization manager (128), a module of computer program instructions for managing virtual boundaries to enable lock-free concurrent region optimization of an integrated circuit according to embodiments described herein. The region optimization manager (128) may be configured to manage virtual boundaries to enable lock-free concurrent region optimization of an integrated circuit by receiving a model of an integrated circuit. The model of the integrated circuit may be embodied, for example, as a data structure that includes information describing the component parts that form the integrated circuit. The model of the integrated circuit may also include information describing how the component parts are connected, details regarding the structures used to connect each component part, and so on. Such a model may be embodied, for example, as a netlist contained in an Electronic Design Interchange Format ('EDIF') file.

The region optimization manager (128) may be further configured to manage virtual boundaries to enable lock-free concurrent region optimization of an integrated circuit by dividing the model into a plurality of regions. Dividing the model into a plurality of regions may be carried out by assigning each object (e.g., circuits designed to carry out specific logic functions) in the integrated circuit to a single region such that all objects within an integrated circuit are assigned to one and only one region. Each object may be assigned to a region, for example, based on predetermined assignment rules. Example of such predetermined assignment rules can include rules which specify that each region is to include a predetermined number of objects, rules which specify that the first region includes the first predetermined number of objects specified in a netlist, rules which specify that the second region includes the second predetermined number of objects specified in a netlist, and so on. Likewise, the predetermined assignment rule may specify that the integrated circuit is to be broken up into a predetermined number of sections, the predetermined assignment rule may specify each object in a particular region must be directly coupled to all other objects in the region, and so on. Readers will appreciate that additional assignment rules may also be utilized to divide the model into a plurality of regions.

The region optimization manager (128) may be further configured to manage virtual boundaries to enable lock-free concurrent region optimization of an integrated circuit by assigning each of the plurality of regions to a thread of execution. Each thread of execution represents the smallest sequence of programmed instructions that can be managed independently by a scheduler that may be included as part of an operating system. Each thread of execution can exist within a single process and may share resources. In fact, each thread of execution can utilize a shared memory space. Readers will appreciate that because each thread of execution utilizes a shared memory space, concurrent region optimization of an integrated circuit may occur more efficiently as the threads do not need to send data between each other when each thread optimizes a particular region, as would occur if the threads did not share a memory space.

Assigning each of the plurality of regions to a thread of execution may be carried out by assigning the regions sequentially using the thread identifiers of each thread, such that a first region is assigned to a first thread, a second region is assigned to a second thread, and so on. Alternatively, assigning each of the plurality of regions to a thread of execution may be carried out more intelligently by assigning threads in dependence upon a set of assignment rules.

The region optimization manager (128) may be further configured to manage virtual boundaries to enable lock-free concurrent region optimization of an integrated circuit by having each thread of execution optimize its assigned region. Each thread of execution can optimize its assigned region in parallel. Each thread of execution may optimize its assigned region, for example, by executing one or more design closure processes where a design of a particular region is modified from its initial description to meet a list of design constraints and objectives. Such design closure processes may include, for example, functional verification processes where a design is verified to perform a certain function, placement processes where elements in each region are assigned to physical locations within the region, routing process where communications pathways between the elements in the region are inserted, design for manufacturability processes where the design of each region is modified to make each region as easy as possible to produce, and so on.

Also stored in RAM (168) is an operating system (154). Operating systems useful for managing virtual boundaries to enable lock-free concurrent region optimization of an integrated circuit according to embodiments described herein include UNIX™ Linux™ Microsoft XP™ AIX™ IBM's i5/OS™ and others as will occur to those of skill in the art. The operating system (154) and the region optimization manager (128) in the example of FIG. 2 are shown in RAM (168), but many components of such software typically are stored in non-volatile memory also, such as, for example, on a disk drive (170).

Figure 2:
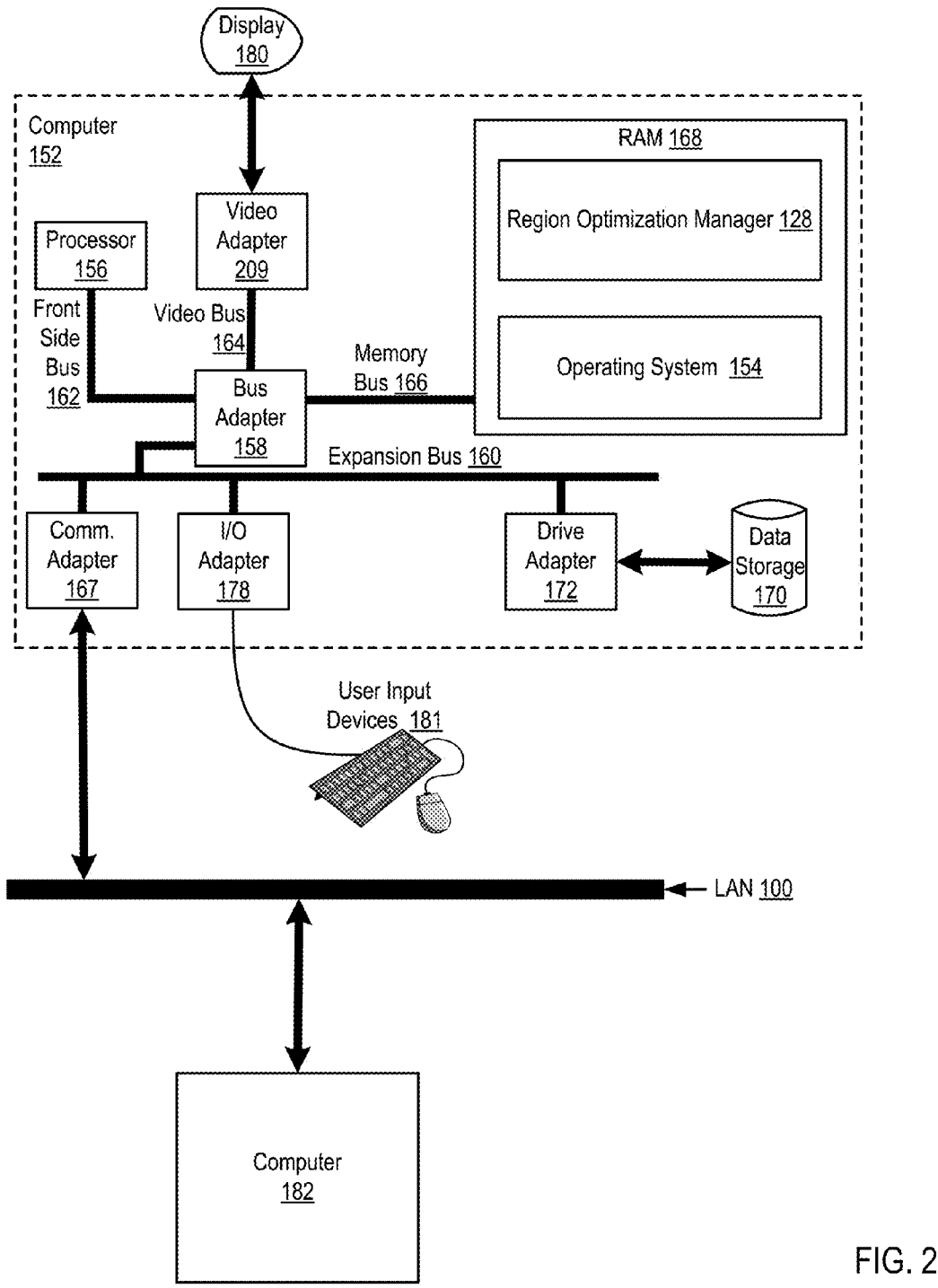
FIG. 2 sets forth a block diagram of automated computing machinery comprising an example computer useful in managing virtual boundaries to enable lock-free concurrent region optimization of an integrated circuit according to embodiments described herein.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for managing virtual boundaries to enable lock-free concurrent region optimization of an integrated circuit according to embodiments described herein include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156)

through a high speed video bus (164), bus adapter (158), and the front side bus (162), which is also a high speed bus.

The example computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing virtual boundaries to enable lock-free concurrent region optimization of an integrated circuit according to embodiments described herein include modems for wired dial-up communications, Ethernet (IEEE 802.3) adapters for wired data communications network communications, and 802.11 adapters for wireless data communications network communications.

Figure 3:
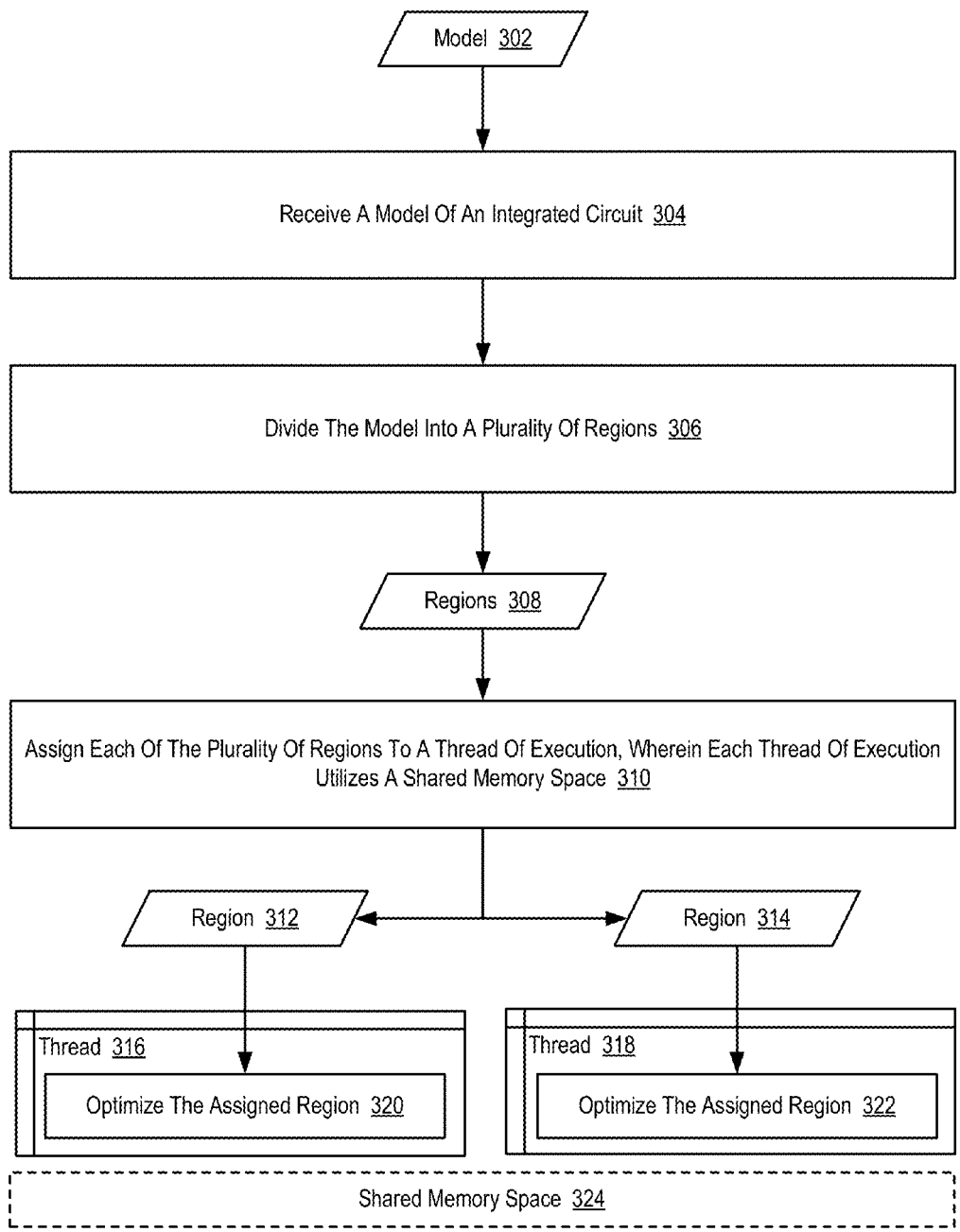
FIG. 3 sets forth a flow chart illustrating an example method for managing virtual boundaries to enable lock-free concurrent region optimization of an integrated circuit according to embodiments described herein.

For further explanation, FIG. 3 sets forth a flow chart illustrating an example method for managing virtual boundaries to enable lock-free concurrent region optimization of an integrated circuit according to embodiments described herein. In the example method depicted in FIG. 3, the integrated circuit may be embodied as a set of electronic circuits on a chip of semiconductor material such as silicon. Region optimization of an integrated circuit can involve partitioning the integrated circuits into a plurality of regions and optimizing the physical layout of each region. In such a way, optimizing the physical layout of an entire integrated circuit can effectively be broken down into smaller tasks of optimizing the physical layout of a particular region, where each region may be optimized concurrently. In such an example, each region is defined by a set of virtual boundaries that designate where one region ends and another begins.

The example method depicted in FIG. 3 includes receiving (304) a model (302) of an integrated circuit. The model (302) of the integrated circuit may be embodied, for example, as a data structure that includes information describing the component parts that form the integrated circuit. The model (302) of the integrated circuit may also include information describing how the component parts are connected, details regarding the structures used to connect each component part, and so on. Such a model (302) may be embodied, for example, as a netlist contained in an EDIF file.

The example method depicted in FIG. 3 also includes dividing (306) the model (302) into a plurality of regions (308). In the example method depicted in FIG. 3, dividing (306) the model (302) into a plurality of regions (308) may be carried out by assigning each object (e.g., circuits designed to carry out specific logic functions) in the integrated circuit to a single region such that all objects within an integrated circuit are assigned to one and only one region. Each object may be assigned, for example, to a region based on predetermined assignment rules. Examples of such predetermined assignment rules can include a predetermined assignment rule specifying that each region is to include a predetermined number of objects, a predetermined assignment rule specifying that the first region includes the first predetermined number of objects specified in a netlist, a predetermined assignment rule specifying that the second region includes the second predetermined number of objects specified in a netlist, and so on. Likewise, the predetermined assignment rule may specify that the integrated circuit is to be broken up into a predetermined number of sections, the predetermined assignment rule may specify each object in a particular region must be directly coupled to all other objects in the region, and so on.

The example method depicted in FIG. 3 also includes assigning (310) each of the plurality of regions (308) to a thread (316, 318) of execution. Each thread (316, 318) of execution represents the smallest sequence of programmed instructions that can be managed independently by a scheduler that may be included as part of an operating system. Each thread (316, 318) of execution can exist within a single process and may share resources. In fact, each thread (316, 318) of execution depicted in FIG. 3 utilizes a shared memory space (324). Readers will appreciate that because each thread (316, 318) of execution depicted in FIG. 3 utilizes a shared memory space (324), the threads (316, 318) may concurrently optimize an integrated circuit more efficiently as the threads (316, 318) will not need to exchange messages as each thread (316, 318) optimizes a particular region, as would be required if the threads (316, 318) did not share a memory space (324). More specifically, a design of an integrated circuit that is being optimized may be loaded into the shared memory space (324) and as various regions are optimized, each thread (316, 318) can access the updated design without exchanging messages in view of the fact that each thread (316, 318) can access the shared memory space (324) that contains the updated design.

In the example method depicted in FIG. 3, assigning (310) each of the plurality of regions (308) to a thread (316, 318) of execution may be carried out by assigning the regions sequentially using the thread identifiers of each thread, such that a first region (312) is assigned (310) to a first thread (316), a second region (314) is assigned (310) to a second thread (318), and so on. Alternatively, assigning (310) each of the plurality of regions (308) to a thread (316, 318) of execution may be carried out more intelligently by assigning threads in dependence upon a set of assignment rules.

The example method depicted in FIG. 3 also includes each thread (316, 318) of execution optimizing (320, 322) the assigned region (312, 314). In the example method depicted in FIG. 3, each thread (316, 318) of execution optimizes (320, 322) its assigned region (312, 314) in parallel. Each thread (316, 318) of execution may optimize (320, 322) its assigned region (312, 314), for example, by executing one or more design closure processes where a design of a particular region (312, 314) is modified from its initial description to meet a list of design constraints and objectives. Such design closure processes may include, for example, functional verification processes where a design is verified to perform a certain function, placement processes where elements in each region are assigned to physical locations within the region, routing process where communications pathways between the elements in the region are inserted, design for manufacturability processes where the design of each region is modified to make each region as easy as possible to produce, and so on.

Figure 4:
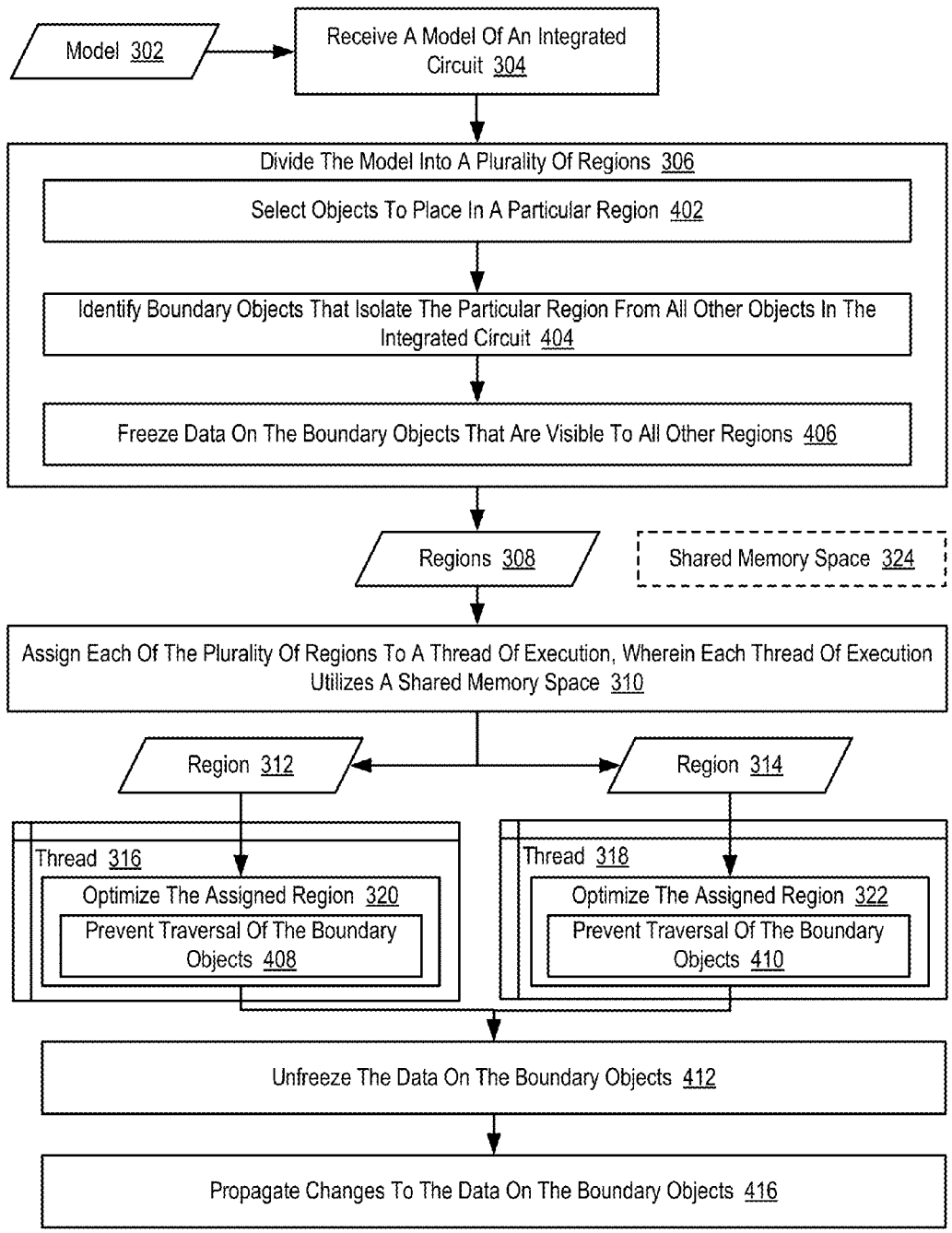
FIG. 4 sets forth a flow chart illustrating an additional example method for managing virtual boundaries to enable lock-free concurrent region optimization of an integrated circuit according to embodiments described herein.

For further explanation, FIG. 4 sets forth a flow chart illustrating a further example method for managing virtual boundaries to enable lock-free concurrent region optimization of an integrated circuit according to embodiments described herein. The example method depicted in FIG. 4 is similar to the example method depicted in FIG. 3, as the example method depicted in FIG. 4 also includes receiving (304) a model (302) of an integrated circuit, dividing (306) the model (302) into a plurality of regions (308), assigning (310) each of the plurality of regions (308) to a thread (316, 318) of execution, and each thread (316, 318) of execution optimizing (320, 322) the assigned region (312, 314).

In the example method depicted in FIG. 4, dividing (306) the model (302) into a plurality of regions (308) can include selecting (402) objects to place in a particular region. Such objects can include, for example, electrical circuits such as logic circuits that carry out a specified logic circuit, cells from a standard cell library, interconnect structures that connect two or more circuits, and so on. Selecting (402) objects to place in a particular region may be carried out, for example, by selecting all objects that perform a particular function, by selecting a predetermined number of objects to include in a particular region, and so on.

In the example method depicted in FIG. 4, dividing (306) the model (302) into a plurality of regions (308) can also include identifying (404) boundary objects that isolate the particular region from all other objects in the integrated circuit. The boundary objects that isolate the particular region from all other objects in the integrated circuit may include, for example, input pins to logic circuits in the particular region that receive signals via connections to objects in other regions of the integrated circuit, output pins from logic circuits in the particular region that output signals via connections to objects in other regions of the integrated circuit, and so on. Identifying (404) boundary objects that isolate the particular region from all other objects in the integrated circuit may therefore be carried out, for example, by determining whether the input pins or output pins for each object in the particular region are electrically coupled to objects that are external to the particular region.

In the example method depicted in FIG. 4, dividing (306) the model (302) into a plurality of regions (308) can also include freezing (406) data on the boundary objects that are visible to all other regions. Freezing (406) data on the boundary objects that are visible to all other regions may be carried out, for example, by freezing the values of input signals to the boundary objects and also freezing the values of output signals from the boundary objects, such that the values of input signals to the boundary objects and the values of output signals from the boundary objects remain constant during an optimization process.

In the example method depicted in FIG. 4, optimizing (320, 322) the assigned region (312, 314) can include preventing (408, 410) traversal of the boundary objects. Preventing (408, 410) traversal of the boundary objects in a particular region (312, 314) may be carried out, for example, by blocking any data traversal operation in a thread (316) optimizing a particular region (312) from accessing any object in another region (314) that is connected to a boundary object. For example, any data iterators operating on a boundary object and used in a thread (316) optimizing one region (312) may be modified to prevent them from returning objects belonging to any other regions (314). In such a way, the objects within a particular region are effectively isolated from other regions and the impact of optimization operations that are being carried out on other regions in the integrated circuit. Readers will appreciate that the benefits of blocking traversal in this way is that modifying the actual optimization functions is not required, and therefore allows reuse of many such functions already written and in use in non-region-based optimization.

Furthermore, preventing (408, 410) traversal of the boundary objects in a particular region (312, 314) can also include blocking the propagation of analysis data (e.g., signal arrival times, signal slews, signal required arrival times, signal noise levels, etc.) through boundary objects such that the view of the data seen by threads optimizing other regions does not change during its optimization of that other region. Blocking propagation of analysis information can be done by modifying the analysis function to recognize and honor boundary objects, or by making use of iterators in the analysis function which themselves have been modified not to return objects belonging to other regions.

The example method depicted in FIG. 4 also includes unfreezing (412) the data on the boundary objects. Unfreezing (412) the data on the boundary objects may be carried out, for example, by propagating analysis data (e.g., signal arrival times, signal slews, signal required arrival times, signal noise levels, etc.) through boundary objects allowing and effectively allowing data that had previously been locked to flow across regions. In such a way, the objects within a particular region are no longer isolated from other regions in the integrated circuit.

The example method depicted in FIG. 4 also includes propagating (416) changes to the data on the boundary objects. In the example method depicted in FIG. 4, propagating (416) changes to the data on the boundary objects may be carried out, for example, by updating the values for the data on the boundary objects in a centralized repository that is accessible to all of the threads of execution, by one thread sending a message to all other threads that includes updated values for the data on the boundary objects, and so on.

Readers will appreciate that in the example method depicted in FIG. 4, unfreezing (412) the data on the boundary objects and propagating (416) changes to the data on the boundary objects will occur after each region (312, 314) is dissolved. Such dissolution occurs when control of the region (312, 314) is passed back to the main thread and after the worker threads (316, 318) have completed the desired optimization operations described above with reference to steps 320 and 322. Such dissolution occurs when control of the region (312, 314) is passed back to the main thread and after the worker threads (316, 318) have completed the desired optimization operations in order to limit the interaction between the worker threads (316, 318) as much as possible to ensure lock-free operation.

Figure 5:
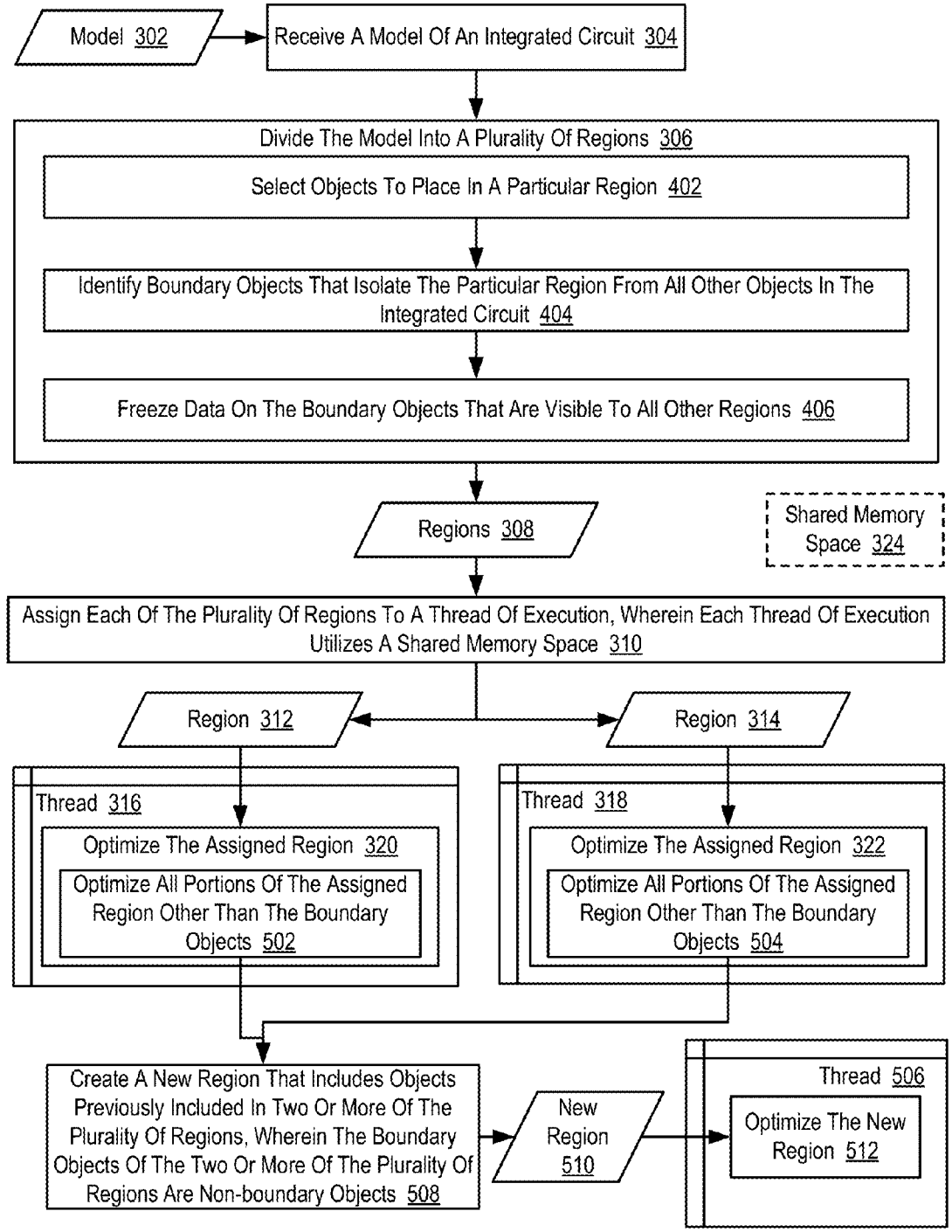
FIG. 5 sets forth a flow chart illustrating an additional example method for managing virtual boundaries to enable lock-free concurrent region optimization of an integrated circuit according to embodiments described herein.

For further explanation, FIG. 5 sets forth a flow chart illustrating a further example method for managing virtual boundaries to enable lock-free concurrent region optimization of an integrated circuit according to embodiments described herein. The example method depicted in FIG. 5 is similar to the example method depicted in FIG. 3, as the example method depicted in FIG. 5 also includes receiving (304) a model (302) of an integrated circuit, dividing (306) the model (302) into a plurality of regions (308), assigning (310) each of the plurality of regions (308) to a thread (316, 318) of execution, and each thread (316, 318) of execution optimizing (320, 322) the assigned region (312, 314). The method depicted in FIG. 5 is also similar to the example method depicted in FIG. 4, as dividing (306) the model (302) into a plurality of regions (308) also includes selecting (402) objects to place in a particular region, identifying (404) boundary objects that isolate the particular region from all other objects in the integrated circuit, and freezing (406) data on the boundary objects that are visible to all other regions.

In the example method depicted in FIG. 5, optimizing (320, 322) the assigned region (312, 314) can include optimizing (502, 504) all portions of the assigned region (312, 314) other than the boundary objects. Referring to the example depicted in FIG. 1, optimizing (502, 504) all portions of the assigned region (312, 314) other than the boundary objects could be carried out by optimizing the portion of the first region (104 of FIG. 1) that includes non-boundary objects (108, 110, 112 of FIG. 1) and also optimizing the portion of the second region (118 of FIG. 1) that includes non-boundary objects (122, 124 of FIG. 1). In such an example, the portions of the integrated circuit (102 of FIG. 1) that include the boundary objects (106, 114, 116 of FIG. 1) of the first region (104 of FIG. 1) and the boundary objects (120, 126 of FIG. 1) of the second region (118 of FIG. 1) would not be optimized.

The example method depicted in FIG. 5 also includes creating (508) a new region (510) that includes objects previously included in two or more of the plurality of regions (312, 314). Creating (508) the new region (510) that includes objects previously included in two or more of the plurality of regions (312, 314) may be carried out, for example, by combining the two or more of the plurality of regions (312, 314). In such an example, at least one of the boundary objects from each of the previously existing regions (312, 314) is a non-boundary object in the new region (510). Referring again to the example depicted in FIG. 1, combining the two or more of the regions (104, 118 of FIG. 1) could result in the creation of a new region where objects (114, 116, 120 of FIG. 1) that were previously boundary objects would become non-boundary objects of the newly created region.

Readers will appreciate that in the example method depicted in FIG. 5, creating (508) a new region (510) that includes objects previously included in two or more of the plurality of regions (312, 314) will occur only after each region (312, 314) is dissolved. Such dissolution occurs when control of the region (312, 314) is passed back to the main thread and after the worker threads (316, 318) have completed the desired optimization operations described above with reference to steps 320 and 322. Such dissolution occurs when control of the region (312, 314) is passed back to the main thread and after the worker threads (316, 318) have completed the desired optimization operations in order to limit the interaction between the worker threads (316, 318) as much as possible to ensure lock-free operation.

The example method depicted in FIG. 5 also includes optimizing (512) the new region (510). In the example method depicted in FIG. 5, a newly created thread (506) may optimize (512) the new region (510), for example, by executing one or more design closure processes where a design of the new region (510) is modified from its initial description to meet a list of design constraints and objectives. Such design closure processes may include, for example, functional verification processes where a design is verified to perform a certain function, placement processes where elements in each region are assigned to physical locations within the region, routing process where communications pathways between the elements in the region are inserted, design for manufacturability processes where the design of each region is modified to make each region as easy as possible to produce, and so on.

Figure 6:
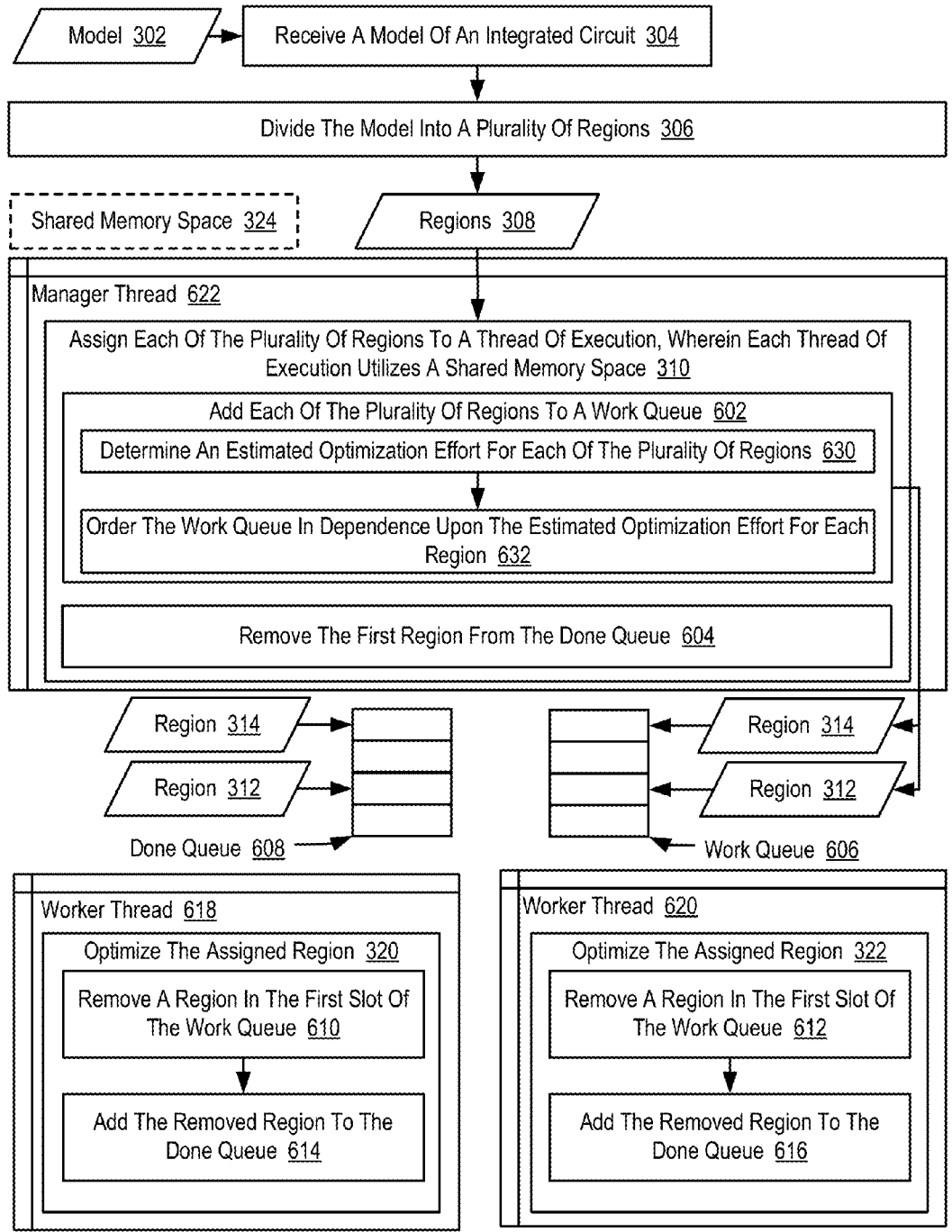
FIG. 6 sets forth a flow chart illustrating an additional example method for managing virtual boundaries to enable lock-free concurrent region optimization of an integrated circuit according to embodiments described herein.

For further explanation, FIG. 6 sets forth a flow chart illustrating a further example method for managing virtual boundaries to enable lock-free concurrent region optimization of an integrated circuit according to embodiments described herein. The example method depicted in FIG. 6 is similar to the example method depicted in FIG. 3, as the example method depicted in FIG. 6 also includes receiving (304) a model (302) of an integrated circuit, dividing (306) the model (302) into a plurality of regions (308), assigning (310) each of the plurality of regions (308) to a thread (618, 620) of execution, and each thread (618, 620) of execution optimizing (320, 322) the assigned region (312, 314).

In the example method depicted in FIG. 6, assigning (310) each of the plurality of regions (308) to a thread (618, 620) of execution can include adding (602), by a manager thread (622), each of the plurality of regions (312, 214) to a work queue (606). In the example method depicted in FIG. 6, the work queue (606) may be embodied as a data structure configured to contain information describing one or more regions (312, 314) that are to be optimized. The work queue (606) may include a plurality of slots where each slot is configured to hold information describing a single region that is to be optimized. The work queue (606) may be embodied, for example, as a first-in-first-out ('FIFO') queue were entries are removed from the work queue (606) in the same order as which they were received, as a last-in-first-out ('LIFO') queue were entries are removed from the work queue (606) in the opposite order as which they were received, and so on. In the example method depicted in FIG. 6, a manager thread (622) is responsible for adding (602) each of the plurality of regions (312, 214) to a work queue (606). The manager thread (622) of FIG. 6 may be embodied as a thread that is configured to manage the creation of regions (312, 314), the distribution of regions (312, 314) to other threads (618, 620) for optimization, and the dissolution of regions (312, 314).

In the example method depicted in FIG. 6, adding (602) each of the plurality of regions (312, 214) to the work queue (606) can include determining (630) an estimated optimization effort for each of the plurality of regions (312, 314). Determining (630) an estimated optimization effort for each of the plurality of regions (312, 314) may be carried out, for example, by identifying the number of objects in a particular region (312, 314) to be optimized, by identifying the types of objects in a particular region (312, 314) to be optimized, by identifying the optimization processes to be carried out in a particular region (312, 314) to be optimized, and so on. In view of the fact that more complicated regions may take longer to optimize and that certain types of objects may take longer to optimize when certain optimization processes are being performed, the amount of computational resources that must be dedicated to optimizing a particular region (312, 314) may be different. In such a way, the estimated optimization effort for each of the plurality of regions (312, 314) can be used as a relative measure of the amount of computational resources that must be dedicated to optimizing each particular region (312, 314).

In the example method depicted in FIG. 6, adding (602) each of the plurality of regions (312, 214) to the work queue (606) can also include ordering (632) the work queue (606) in dependence upon the estimated optimization effort for each region (312, 314). The work queue (606) may be ordered (632) in dependence upon the estimated optimization effort for each region (312, 314), for example, such that the regions (312, 314) with the largest estimated optimization effort are placed at the beginning of the queue. In such a way, optimization of the regions (312, 314) with the largest estimated optimization effort may begin first as these regions will be pulled from the work queue (606) first. Readers will appreciate that by beginning the optimization of the regions (312, 314) with the largest estimated optimization effort first, the worker threads (618, 620) may be more efficiently utilized—rather than creating a situation where the optimization of a region with a relatively large estimated optimization effort begins when the work queue (606) is relatively empty and some worker threads have no regions that are in need of optimizing.

In the example method depicted in FIG. 6, optimizing (320, 322) the assigned region (312, 314) can include removing (610, 612), by a worker thread (618, 620), a region (312, 314) in the first slot of the work queue (606). The worker threads (618, 620) of FIG. 6 may be embodied as threads that are configured to carry out optimization processes of regions (312, 314), with little or no responsibility for creating the regions (312, 314) and dissolving the regions (312, 314). Readers will appreciate that while the example method depicted in FIG. 6 describes the worker threads (618, 620) removing (610, 612) a region (312, 314) in the first slot of the work queue (606), the slot that is designated as the 'first' slot will depend on the nature of the work queue (606). For example, in implementations where the work queue (606) is embodied as a linked list, the 'first' slot may be designated by a pointer that moves as entries are removed from the work queue (606) or added to the work queue (606).

In the example method depicted in FIG. 6, optimizing (320, 322) the assigned region (312, 314) can also include adding (614, 616), by the worker thread (618, 620), the removed region (312, 314) to the done queue (608). The done queue (608) depicted in FIG. 6 may be embodied, for example, as a data structure for storing information describing regions (312, 314) that have been optimized by one of the worker threads (618, 620).

The example method depicted in FIG. 6 also includes removing (604), by the manager thread (622), the first region from the done queue (608). In the example method depicted in FIG. 6, the manager thread (622) may dissolve a particular region in response to removing (604) the region (312, 314) from the done queue (608). In such an example, dissolving a particular region may be carried out by unfreezing data on boundary objects contained in the region, propagating changes made to the region, making the objects contained in the region available for inclusion in another region that is to be optimized, and so on.

Figure 7:
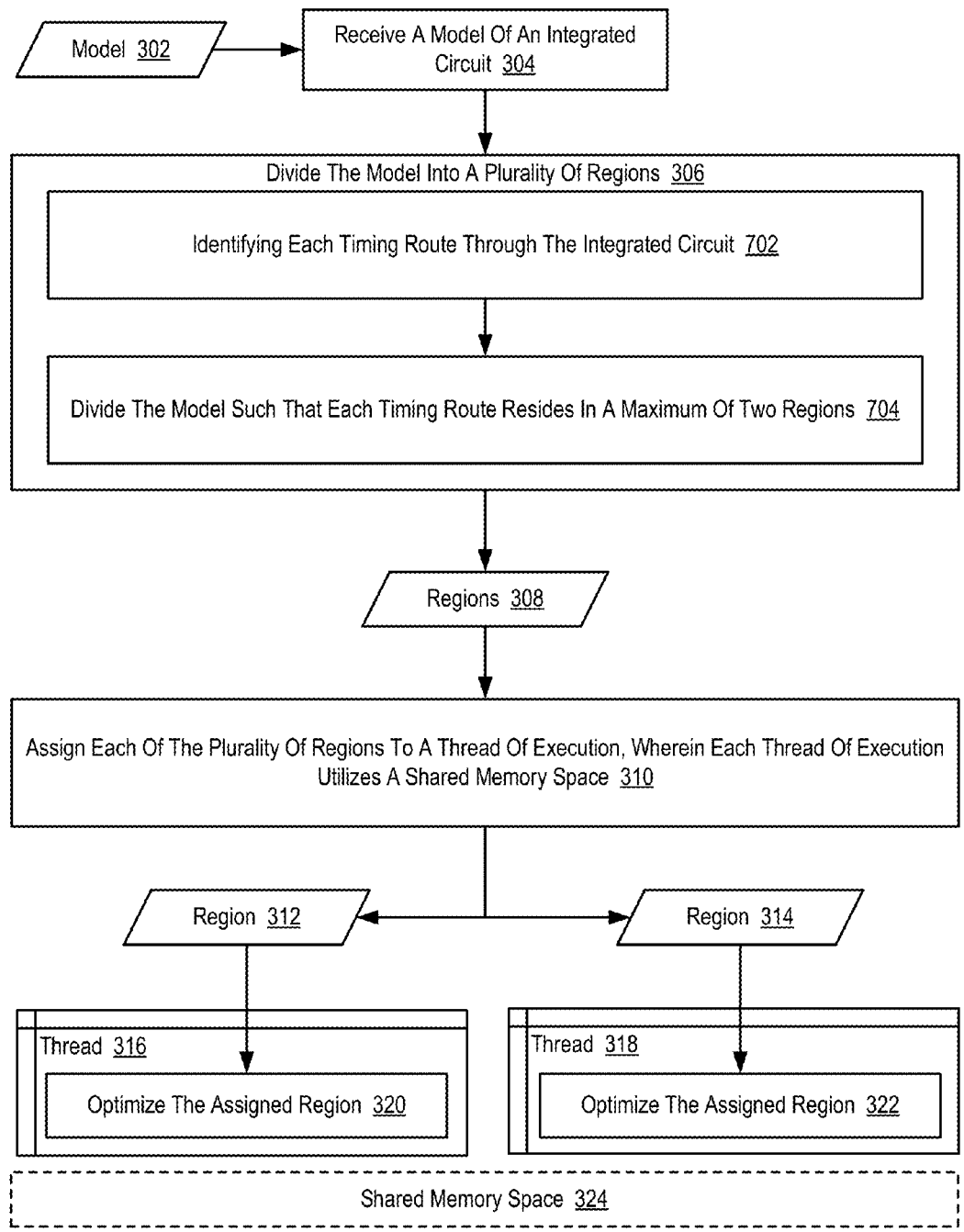
FIG. 7 sets forth a flow chart illustrating an additional example method for managing virtual boundaries to enable lock-free concurrent region optimization of an integrated circuit according to embodiments described herein.

For further explanation, FIG. 7 sets forth a flow chart illustrating a further example method for managing virtual boundaries to enable lock-free concurrent region optimization of an integrated circuit according to embodiments described herein. The example method depicted in FIG. 7 is similar to the example method depicted in FIG. 3, as the example method depicted in FIG. 7 also includes receiving (304) a model (302) of an integrated circuit, dividing (306) the model (302) into a plurality of regions (308), assigning (310) each of the plurality of regions (308) to a thread (618, 620) of execution, and each thread (618, 620) of execution optimizing (320, 322) the assigned region (312, 314).

In the example method depicted in FIG. 7, dividing (306) the model (302) into a plurality of regions (308) can include identifying (702) each timing route through the integrated circuit. In the example method depicted in FIG. 7, one design constraint may specify the frequency at which the integrated circuit should operate at. For example, a design constraint may specify that an integrated circuit should operate at 50 MHz, and as such, a signal must be able to complete a hop from one object in signal path to another object in the signal path within a period of time that is equal to one clock cycle of a clock operating at a clock speed of 50 MHz.

Such design constraints may also specify an allowable slack time. The slack associated with each connection is the difference between the required time and the arrival time. A positive slack of value X at a node implies that circuit will operate at the desired frequency if the arrival time at that node is increased by X. Conversely, negative slack implies that a path is too slow, and the path must be sped up (or the capturing clock signal delayed) if the whole circuit is to work at the desired speed.

Reader will appreciate, however, that multiple routes through the integrated circuit (102 of FIG. 1) exist. For example, a first route can include a signal passing through a first series of objects (106, 108, 110, 112, 114, 120, 122, 124, 126 of FIG. 1) while a second route can include a signal passing through a second series of objects (106, 108, 110, 112, 116, 120, 122, 124, 126 of FIG. 1). In such an example, each route represents a distinct timing route as the signal must be able to pass through each route in accordance with the frequency at which the integrated circuit should operate at, as specified in a design constraint. As such, as part of the design closure process, the objects and signal paths that form each timing route must be optimized so as to satisfy the design constraints.

In the example method depicted in FIG. 7, dividing (306) the model (302) into a plurality of regions (308) can also include dividing (704) the model (302) such that each timing route resides in a maximum of two regions (312, 314). By dividing (704) the model (302) such that each timing route resides in a maximum of two regions (312, 314), the slack time may be easily apportioned and a thread processing each region can avoid receiving stale timing data, such that integrated circuit may be optimized to adhere to the timing constraints that are placed on the entire integrated circuit. Continuing with the example described above where the design constraint specified that the integrated circuit should operate at a frequency of 50 MHz frequency with a predetermined allowable amount of slack. In such an example, given that each timing route is broken up into no more than two regions, the first region may be given an acceptable slack time that is one-half of the total slack time for the integrated circuit while the second region may also be given an acceptable slack time that is one-half of the total slack time for the integrated circuit, such that even if each region consumes it's maximum allowable slack, total slack for the integrated circuit is within the guidelines specified in the design constraints.

Embodiments described herein may be a system, a method, and/or a computer program product. The computer program product may include a computer readable storage medium (or media) having computer readable program instructions thereon for causing a processor to carry out aspects of embodiments described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments described herein.

Aspects of embodiments described herein are described with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method of managing virtual boundaries to enable lock-free concurrent region optimization, the method comprising:
   receiving a model of an integrated circuit ('IC');
   dividing the model into a plurality of regions, wherein none of the plurality of regions overlap with another region, including:
     selecting objects to place in a particular region;
     identifying boundary objects that isolate the particular region from all other objects in the integrated circuit; and
     freezing data on the boundary objects that are visible to all other regions including freezing values of input signals to the boundary objects and output signals from the boundary objects, wherein the values of the input signals to the boundary objects and the output signals from the boundary objects remain constant during the optimization;
   assigning each of the plurality of regions to a thread of execution, wherein each thread of execution utilizes a shared memory space;
   optimizing, by each thread in parallel and without locking any of the objects in any of the regions, the assigned region, including optimizing all portions of the assigned region other than the boundary objects;
   creating a new region that includes objects previously included in two or more of the plurality of regions, wherein at least one of the boundary objects in each of the two or more of the plurality of regions become non-boundary objects in the new region, including unfreezing data on the boundary objects that become non-boundary objects; and optimizing the new region.

2. The method of claim 1 wherein optimizing, by each thread in parallel, the assigned region further comprises preventing traversal of the boundary objects, the method further comprising:

unfreezing the data on the boundary objects; and
propagating changes to the data on the boundary objects.

3. The method of claim 1 wherein:

assigning each of the plurality of regions to the thread of execution further comprises adding, by a manager thread, each of the plurality of regions to a work queue; and optimizing the assigned region further comprises:
removing, by a worker thread, a region in the first slot of the work queue; and
adding, by the worker thread, the removed region to the done queue; and the method further comprising removing, by the manager thread, the first region from the done queue.

4. The method of claim 3 wherein adding, by the manager thread, each of the plurality of regions to the work queue further comprises:

determining an estimated optimization effort for each of the plurality of regions by identifying a number of objects, types of the objects, and optimization processes to be carried out in each region of the plurality of regions; and ordering the work queue in dependence upon the estimated optimization effort for each region.

5. The method of claim 1 wherein dividing the model into a plurality of regions further comprises:

identifying each timing route through the integrated circuit; and dividing the model such that each timing route resides in a maximum of two regions.

6. Apparatus for managing virtual boundaries to enable lock-free concurrent region optimization, the apparatus comprising a computer processor, a computer memory operatively coupled to the computer processor, the computer memory having disposed within it computer program instructions that, when executed by the computer processor, cause the apparatus to carry out the steps of:

receiving a model of an integrated circuit ('IC');
dividing the model into a plurality of regions, wherein none of the plurality of regions overlap with another region, including:
selecting objects to place in a particular region;
identifying boundary objects that isolate the particular region from all other objects in the integrated circuit; and
freezing data on the boundary objects that are visible to all other regions including freezing values of input signals to the boundary objects and output signals from the boundary objects, wherein the values of the input signals to the boundary objects and the output signals from the boundary objects remain constant during the optimization;

assigning each of the plurality of regions to a thread of execution, wherein each thread of execution utilizes a shared memory space;

optimizing, by each thread in parallel and without locking any of the objects in any of the regions, the assigned region, including optimizing all portions of the assigned region other than the boundary objects;

creating a new region that includes objects previously included in two or more of the plurality of regions, wherein at least one of the boundary objects in each of the two or more of the plurality of regions become non-boundary objects in the new region, including unfreezing data on the boundary objects that become non-boundary objects; and optimizing the new region.

7. The apparatus of claim 6 wherein optimizing, by each thread in parallel, the assigned region further comprises preventing traversal of the boundary objects, the method further comprising:

unfreezing the data on the boundary objects; and
propagating changes to the data on the boundary objects.

8. The apparatus of claim 6 wherein:

assigning each of the plurality of regions to the thread of execution further comprises adding, by a manager thread, each of the plurality of regions to a work queue; and optimizing the assigned region further comprises:
removing, by a worker thread, a region in the first slot of the work queue; and
adding, by the worker thread, the removed region to the done queue; and the apparatus further comprising computer program instructions that, when executed by the computer processor, cause the apparatus to carry out the step of removing, by the manager thread, the first region from the done queue.

9. The apparatus of claim 8 wherein adding, by the manager thread, each of the plurality of regions to the work queue further comprises:

determining an estimated optimization effort for each of the plurality of regions by identifying a number of objects, types of the objects, and optimization processes to be carried out in each region of the plurality of regions; and ordering the work queue in dependence upon the estimated optimization effort for each region.

10. The apparatus of claim 6 wherein dividing the model into a plurality of regions further comprises:

identifying each timing route through the integrated circuit; and dividing the model such that each timing route resides in a maximum of two regions.

11. A computer program product for managing virtual boundaries to enable lock-free concurrent region optimization, the computer program product disposed upon a machine-readable non-transitory storage device, the computer program product comprising computer program instructions that, when executed by a machine, cause the machine to carry out the steps of:

receiving a model of an integrated circuit ('IC');
dividing the model into a plurality of regions, wherein none of the plurality of regions overlap with another region, including:
selecting objects to place in a particular region;
identifying boundary objects that isolate the particular region from all other objects in the integrated circuit; and
freezing data on the boundary objects that are visible to all other regions including freezing values of input signals to the boundary objects and output signals from the boundary objects, wherein the values of the input signals to the boundary objects and the output signals from the boundary objects remain constant during the optimization;

assigning each of the plurality of regions to a thread of execution, wherein each thread of execution utilizes a shared memory space;

optimizing, by each thread in parallel and without locking any of the objects in any of the regions, the assigned region, including optimizing all portions of the assigned region other than the boundary objects;

creating a new region that includes objects previously included in two or more of the plurality of regions, wherein at least one of the boundary objects in each of the two or more of the plurality of regions become non-boundary objects in the new region, including unfreezing data on the boundary objects that become non-boundary objects; and optimizing the new region.

12. The computer program product of claim 11 wherein optimizing, by each thread in parallel, the assigned region further comprises preventing traversal of the boundary objects, the method further comprising:

unfreezing the data on the boundary objects; and propagating changes to the data on the boundary objects.

13. The computer program product of claim 11 wherein:

assigning each of the plurality of regions to the thread of execution further comprises adding, by a manager thread, each of the plurality of regions to a work queue; and optimizing the assigned region further comprises:

removing, by a worker thread, a region in the first slot of the work queue; and adding, by the worker thread, the removed region to the done queue; and the apparatus further comprising computer program instructions that, when executed by the machine, cause the machine to carry out the step of removing, by the manager thread, the first region from the done queue.

14. The computer program product of claim 13 wherein adding, by the manager thread, each of the plurality of regions to the work queue further comprises:

determining an estimated optimization effort for each of the plurality of regions by identifying a number of objects, types of the objects, and optimization processes to be carried out in each region of the plurality of regions; and ordering the work queue in dependence upon the estimated optimization effort for each region.

15. The computer program product of claim 11 wherein dividing the model into a plurality of regions further comprises:

identifying each timing route through the integrated circuit; and dividing the model such that each timing route resides in a maximum of two regions.

* * * * *